(12) United States Patent
Takeuchi

(10) Patent No.: US 9,965,660 B2
(45) Date of Patent: May 8, 2018

(54) COMMUNICATION DEVICE, NON-CONTACT TYPE CARD READER, AND WIRELESS SYSTEM

(71) Applicant: NIDEC SANKYO CORPORATION, Suwa-gun, Nagano (JP)

(72) Inventor: Junro Takeuchi, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days. days.

(21) Appl. No.: 15/217,130

(22) Filed: Jul. 22, 2016

(65) Prior Publication Data
US 2017/0024636 A1   Jan. 26, 2017

(30) Foreign Application Priority Data

Jul. 22, 2015   (JP) ................................ 2015-144733

(51) Int. Cl.
*G06K 5/00* (2006.01)
*G06K 7/10* (2006.01)

(52) U.S. Cl.
CPC ..... *G06K 7/10316* (2013.01); *G06K 7/10158* (2013.01); *G06K 7/10217* (2013.01)

(58) Field of Classification Search
USPC ......................................................... 235/451
See application file for complete search history.

(56) References Cited

U.S. PATENT DOCUMENTS

2004/0140360 A1* 7/2004 Deguchi ............ G06K 7/10346
235/451

FOREIGN PATENT DOCUMENTS

JP     2004356765 A    12/2004
JP     2005136944 A    5/2005

* cited by examiner

*Primary Examiner* — Rafferty Kelly
(74) *Attorney, Agent, or Firm* — Cantor Colburn LLP

(57) ABSTRACT

A communication device having a function for supplying electric power to a communication partner may include a non-contact control section configured to balanced-output transmission power, an antenna circuit configured to transmit the transmission power as an electromagnetic wave, and a matching circuit which is disposed between an output of the non-contact control section and an input of the antenna circuit and is configured to perform impedance matching. The matching circuit and the antenna circuit are respectively provided with two systems and circuit structures from the output of the non-contact control section to the antenna circuits via the matching circuits of the two systems are formed symmetrically.

30 Claims, 6 Drawing Sheets

COMMUNICATION DEVICE, NON-CONTACT TYPE CARD READER, AND WIRELESS SYSTEM

CROSS REFERENCE TO RELATED APPLICATION

The present invention claims priority under 35 U.S.C. § 119 to Japanese Application No. 2015-144733 filed Jul. 22, 2015, the entire content of which is incorporated herein by reference.

FIELD OF THE INVENTION

At least an embodiment of the present invention may relate to a communication device, a non-contact type card reader and a wireless system which are capable of communicating with a non-contact type IC card.

BACKGROUND

A non-contact type IC card is capable of easily exchanging information with a device which performs reading and writing of the information (referred to as a non-contact type IC card reader or a non-contact type IC card reader/writer) by wireless communication. The non-contact type IC card is provided with many superior features such as a larger memory capacity in comparison with a magnetic card and a high tolerance against fraudulent reading and tampering of stored information. Therefore, a non-contact type IC card has been widely and generally utilized in recent years in applications such as a credit card for a financial institution, a card for storing electronic money, a commuter pass for means of transportation.

In these systems, there are many cases that no cell is provided in a non-contact type IC card and the non-contact type IC card is operated by non-contact power feeding through an electromagnetic wave emitted from a non-contact type IC card reader (see, for example, Japanese Patent Laid-Open No. 2004-356765 and Japanese Patent Laid-Open No. 2005-136944).

In the systems of the above-mentioned applications, bidirectional data transmissions are required, in other words, a direction from a non-contact type IC card reader to a non-contact type IC card and a direction from the non-contact type IC card to the non-contact type IC card reader are required. In the direction from the non-contact type IC card reader to the non-contact type IC card, data transmission is performed by carrying out ASK (Amplitude Shift Keying) modulation of a carrier emitted from the non-contact type IC card reader.

On the other hand, in a direction from the non-contact type IC card to the non-contact type IC card reader, the non-contact type IC card is not provided with a power supply (cell) and thus the non-contact type IC card is not provided with a function for emitting a carrier. Therefore, in a non-contact type IC card, data transmitting function is realized by a so-called "load modulation system" in which a carrier emitted from the non-contact type IC card reader is received by a load resistance connected with a tuning circuit structured of an inductor and a capacitor and a value of the load resistance is varied corresponding to "1"/"0" of emitted data.

The non-contact type IC card reader detects a voltage variation of its antenna coil generated depending on a variation of the value of the load resistance of the non-contact type IC card and data from the non-contact type IC card to the non-contact type IC card reader are reproduced.

As described above, the non-contact type IC card reader is required to supply electric power to a non-contact type IC card when communication is performed. An electromagnetic wave is generated as means for supplying electric power. However, this system is classified as a radio system and thus radioactive emission of an electromagnetic wave level (transmission power level) is required to keep within a specified value prescribed by Radio Law in each country.

In order to secure a communication distance with a non-contact type IC card, a sufficient electromagnetic wave is required. The higher the electromagnetic wave level (transmission power level) is, the radiation level from a product becomes larger and thus a margin becomes insufficient for the specified value of Radio Law (radioactive emission) or may exceed the specified value.

SUMMARY

In view of the problem described above, at least an embodiment of the present invention may advantageously provide a communication device, a non-contact type card reader and a wireless system which are capable of lowering an unnecessary radiation wave while securing a necessary transmission electric power value.

According to at least an embodiment of the present invention, there may be provided a communication device having a function for supplying electric power to a communication partner. The communication device includes a non-contact control section configured to balanced-output transmission power, an antenna circuit configured to transmit the transmission power as an electromagnetic wave, and a matching circuit which is disposed between an output of the non-contact control section and an input of the antenna circuit and is configured to perform impedance matching. The matching circuit and the antenna circuit are respectively provided with two systems, and circuit structures from the output of the non-contact control section to the antenna circuits via the matching circuits of the two systems are formed symmetrically.

As described above, in at least an embodiment of the present invention, the circuit structures from an output of the non-contact control section to two systems of the antenna circuit via the matching circuit are formed symmetrically. Therefore, a margin for a specified value determined by Radio Law (radioactive emission) is prevented from becoming insufficient or, alternatively, a situation exceeding the specified value is prevented and thus, while securing a sufficient electromagnetic wave level (transmission power level), a radiation level of a harmonic component of a transmission power carrier can be lowered or can be diffused. In other words, according to at least an embodiment of the present invention, while securing a necessary transmission electric power value, an unnecessary radiation wave can be lowered.

Preferably, the communication device includes a filter circuit which is disposed between the output of the non-contact control section and an input of the matching circuit and configured to input a predetermined frequency component of the transmission power outputted from the non-contact control section into the matching circuit, the filter circuit is provided with two systems, and structures of the filter circuits of the two systems are formed symmetrically.

As described above, in at least an embodiment of the present invention, the circuit structures from an output of the non-contact control section to two systems of the antenna circuit via the filter circuit and the matching circuit are formed symmetrically. Therefore, a margin for a specified value determined by Radio Law (radioactive emission) is prevented from becoming insufficient or, alternatively, a situation exceeding the specified value is prevented and thus, while securing a sufficient electromagnetic wave level (transmission power level), a radiation level of a harmonic component of a transmission power carrier can be lowered or can be diffused. In other words, according to at least an embodiment of the present invention, while securing a necessary transmission electric power value, an unnecessary radiation wave can be lowered.

Preferably, the communication device includes a substrate, and the non-contact control section, balanced transmission lines for transmitting electric power, and respective circuit elements of the two systems are arranged on one face side of the substrate. As described above, in at least an embodiment of the present invention, the non-contact control section, balanced transmission lines for transmitting electric power, and respective circuit elements of the two systems are arranged on one face side of the substrate. Therefore, a structure and manufacture of the circuits are easy and, in addition, while securing a sufficient electromagnetic wave level (transmission power level), a radiation level of a harmonic component of a transmission power carrier can be lowered or diffused.

Preferably, the communication device includes a substrate whose first face and second face facing the first face are capable of disposing structural elements, and balanced transmission lines for transmitting electric power and respective circuit elements of the two systems are symmetrically arranged over the first face and the second face of the substrate. As described above, in at least an embodiment of the present invention, the non-contact control section, balanced transmission lines for transmitting electric power and respective circuit elements of two systems are symmetrically arranged over the first face and the second face of the substrate. Therefore, negative and positive harmonic components generated in a route to the antenna terminating ends can be canceled and reduced. As a result, while securing a sufficient electromagnetic wave level (transmission power level), a radiation level of a harmonic component of a transmission power carrier can be lowered or diffused.

Preferably, circuits from balanced outputs of the non-contact control section to substrate pattern terminating ends are arranged so as to be symmetrically crossed over the first face and the second face. As described above, in at least an embodiment of the present invention, circuits from the balanced outputs to the substrate pattern terminating ends are arranged so as to be symmetrically crossed over the first face and the second face. Therefore, negative and positive harmonic components generated in a route to the antenna terminating ends can be surely canceled and reduced.

Preferably, substrate patterns of balanced transmission lines for transmitting electric power and respective circuit elements of the two systems are arranged so as to be symmetrically crossed over the first face and the second face of the substrate. As described above, in at least an embodiment of the present invention, substrate patterns of balanced transmission lines for transmitting electric power and components (circuit elements) are arranged so as to be symmetrically crossed over the first face and the second face of the substrate and balanced transmission is performed. Therefore, a radiation level of a harmonic component of a transmission power carrier can be lowered.

Preferably, the first face of the substrate is arranged with a circuit of a first system of the two systems, the second face is arranged with a circuit of a second system of the two systems, the circuits of the two systems are arranged so as to form two lines of circuit arrangements from balanced outputs of the non-contact control section, the circuit arrangement of a first line is disposed with the circuit of the first system and the circuit of the second system sequentially from a first balanced output of the non-contact control section, and an output side node of the circuit in a former stage and an input side node of the circuit in a latter stage are connected with each other, the circuit arrangement of a second line is disposed with the circuit of the second system and the circuit of the first system sequentially from a second balanced output of the non-contact control section, and an output side node of the circuit in a former stage and an input side node of the circuit in a latter stage are connected with each other, and predetermined nodes of the circuit of the first system and the circuit of the second system of similar circuits of the two systems are connected with each other in the circuit arrangements of the first line and the second line. As described above, in at least an embodiment of the present invention, the substrate patterns of balanced transmission lines for transmitting electric power and the components (circuit elements) are arranged on the first face and the second face of the substrate so as to be symmetrically crossed in a substantially complete manner and balanced transmission is performed and thus a radiation level of a harmonic component of the transmission power carrier can be lowered surely and efficiently.

Preferably, two systems of the filter circuit, the matching circuit and the antenna circuit are provided for balanced outputs of the non-contact control section, the first face of the substrate is arranged with the filter circuit, the matching circuit and the antenna circuit of a first system of the two systems, the second face of the substrate is arranged with the filter circuit, the matching circuit and the antenna circuit of a second system of the two systems, the circuits of the two systems are arranged so as to form two lines of circuit arrangements from balanced outputs of the non-contact control section, the circuit arrangement of a first line is sequentially disposed with the filter circuit of the first system, the matching circuit of the second system, and the antenna circuit of the first system from a first balanced output of the non-contact control section, an output side node of the filter circuit of the first system and an input side node of the matching circuit of the second system are connected with each other, and an output side node of the matching circuit of the second system and an input side node of the antenna circuit of the first system are connected with each other, the circuit arrangement of a second line is sequentially disposed with the filter circuit of the second system, the matching circuit of the first system, and the antenna circuit of the second system from a second balanced output of the non-contact control section, an output side node of the filter circuit of the second system and an input side node of the matching circuit of the first system are connected with each other, and an output side node of the matching circuit of the first system and an input side node of the antenna circuit of the second system are connected with each other, predetermined nodes of the filter circuit of the first system in the circuit arrangement of the first line and the filter circuit of the second system in the circuit arrangement of the second line of the filter circuits of the two systems are connected with each other, predetermined nodes of the matching circuit of the second system in the circuit arrangement of the first line and the matching circuit of the first system in the circuit arrangement of the second line of the matching circuits of the two systems are connected with each other, and predetermined nodes of the antenna circuit of the first system in the circuit arrangement of the first line and the antenna circuit of the second system in the circuit arrangement of the second line of the antenna circuits of the two systems are connected with each other. As described above, in at least an embodiment of the present invention, the substrate patterns of balanced transmission lines for transmitting electric power and the components (circuit elements) are arranged on the first face and the second face of the substrate so as to be symmetrically crossed in a substantially complete manner and balanced transmission is performed and thus a radiation level of a harmonic component of the transmission power carrier can be surely and efficiently lowered.

Preferably, first transmission power which is outputted from the first balanced output of the non-contact control section is transmitted through the circuits of the first system of the circuit arrangements of the first line and the second line, and second transmission power which is outputted from the second balanced output of the non-contact control section is transmitted through the circuits of the second system of the circuit arrangements of the first line and the second line. As described above, in at least an embodiment of the present invention, a signal is transmitted through each of the two systems and the signal of the other system can be suppressed from being mixed and, as a result, a radiation level of a harmonic component of the transmission power carrier can be reduced surely and efficiently.

Preferably, an antenna of the antenna circuit includes a loop antenna formed by a pattern of the substrate, circuits from balanced outputs of the non-contact control section to terminating ends of the loop antennas formed by a pattern of the substrate are wired in the same length, the same width and the same thickness as each other, and the circuits including the substrate are symmetrically arranged. As described above, in at least an embodiment of the present invention, circuits from balanced outputs of the non-contact control section to terminating ends of the loop antennas formed by a pattern of the substrate are wired in the same length, the same width and the same thickness as each other, and the circuits including the substrate are symmetrically arranged. Therefore, negative and positive harmonic components generated in a route to the loop antenna terminating ends can be surely canceled and reduced and a radiation level of a harmonic component of the transmission power carrier can be reduced.

The non-contact type card reader in accordance with at least an embodiment of the present invention includes the communication device having a function for supplying electric power to a non-contact type IC card when the non-contact type card reader is to be wirelessly communicated with the non-contact type IC card, and the communication device being described in one of the above paragraphs. According to the non-contact type card reader in accordance with at least an embodiment of the present invention, negative and positive harmonic components generated in a route to the antenna terminating ends can be surely canceled and reduced As a result, while securing a sufficient electromagnetic wave level (transmission power level), a radiation level of a harmonic component of a transmission power carrier can be lowered or diffused.

The wireless system in accordance with at least an embodiment of the present invention includes a non-contact type IC card and the above-mentioned non-contact type card reader including the communication device having a function for supplying electric power to the non-contact type IC card when the non-contact type card reader is to be wirelessly communicated with the non-contact type IC card. According to the wireless system in accordance with at least an embodiment of the present invention, a radiation level of a harmonic component of a transmission power carrier can be lowered or diffused while securing a sufficient electromagnetic wave level (transmission power level), and wireless communication in conformity with the regulations can be realized.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings.

Figure 1:
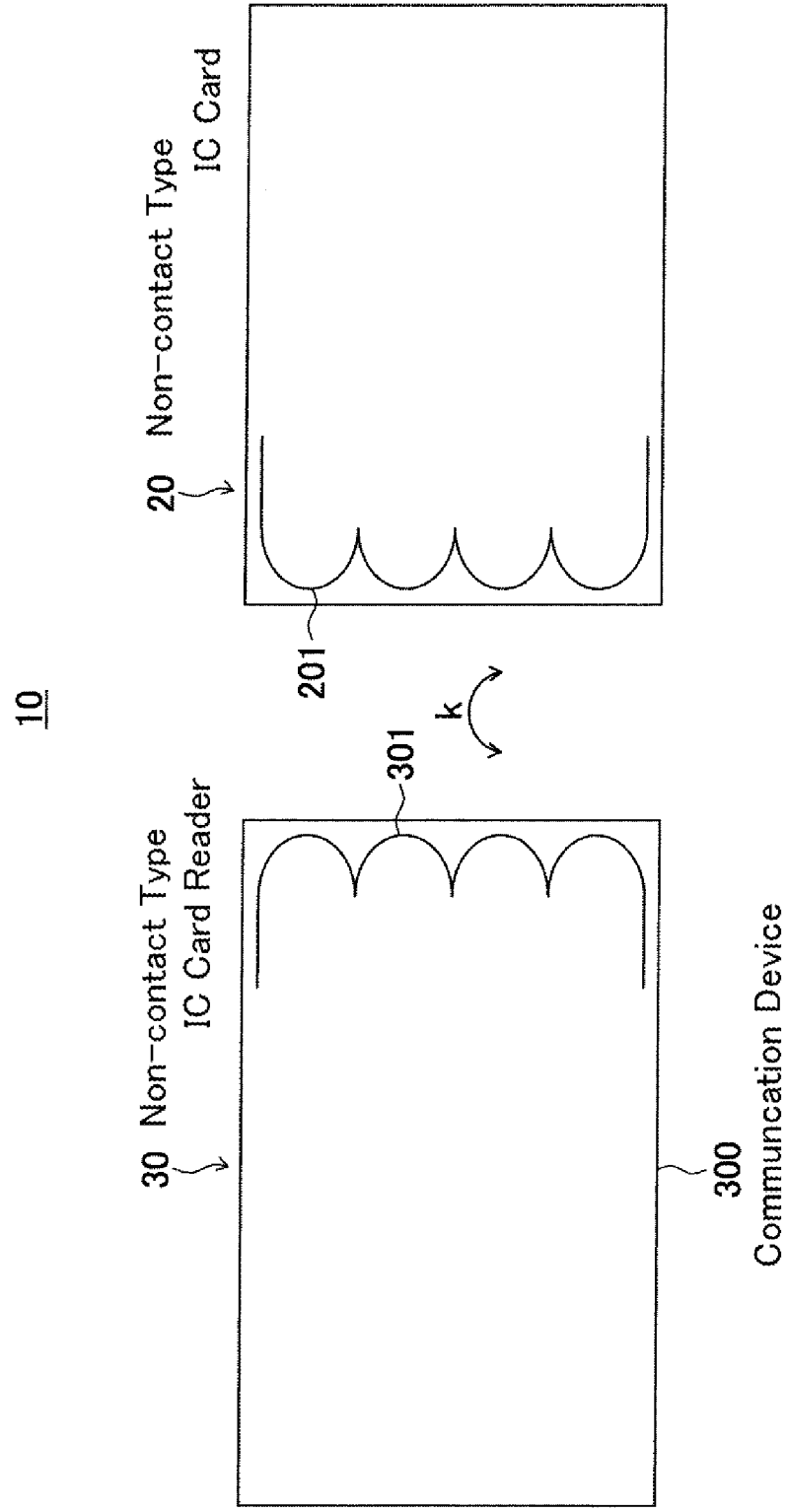
FIG. 1 is a view showing a basic structural example of a wireless system in accordance with an embodiment of the present invention.

FIG. 1 is a view showing a basic structural example of a wireless system in accordance with an embodiment of the present invention.

A wireless system 10 in accordance with an embodiment of the present invention is structured so as to include a non-contact type IC card 20 and a non-contact type IC card reader (writer) 30. In this embodiment, the non-contact type IC card reader 30 is provided with a writing function to a non-contact type IC card 20 in addition to a reading function from the non-contact type IC card 20. Therefore, in this embodiment, a non-contact type card reader writer is simply referred to as a non-contact type card reader.

A non-contact type IC card 20 includes an antenna coil 201 and transmitting/receiving circuits not shown. A non-contact type IC card reader 30 includes a communication device 300 including an antenna coil 301.

An antenna coil 201 of a non-contact type IC card 20 is electromagnetically coupled to the antenna coil 301 in the communication device 300 of the non-contact type IC card reader 30 with a coupling coefficient "k". The coupling coefficient "k" is a value depending on a distance between a non-contact type IC card 20 and the communication device 300 of the non-contact type IC card reader 30 and, when the distance="∞", the "k"=0. The coupling coefficient "k" does not depend upon merely a distance and is affected by a magnetic shield and the like. Therefore, the coupling coefficient "k" can be varied by using a magnetic shield or a magnetic sheet.

The communication device 300 of the non-contact type IC card reader 30 is structured so as to include a function for supplying electric power to a non-contact type IC card 20 having no power supply when wirelessly communicating with the non-contact type IC card 20. In other words, in a wireless system 10 in this embodiment, a non-contact type IC card 20 is not provided with a cell and the non-contact type IC card 20 is operated by non-contact power feeding by an electromagnetic wave emitted from the non-contact type IC card reader 30.

In the wireless system 10, bidirectional data transmissions are required which are in a direction from a non-contact type IC card reader 30 to a non-contact type IC card 20 and in a direction from the non-contact type IC card 20 to the non-contact type IC card reader 30. In the direction from the non-contact type IC card reader 30 to the non-contact type IC card 20, data transmission is performed, for example, by amplitude Shift Keying (ASK) modulation of a carrier which is emitted from the non-contact type IC card reader 30.

On the other hand, in the direction from the non-contact type IC card 20 to the non-contact type IC card reader 30, the non-contact type IC card 20 is not provided with a cell and thus the non-contact type IC card 20 is not provided with a function for emitting a carrier from the non-contact type IC card 20. Therefore, the non-contact type IC card realizes data transmitting function, for example, by a "load modulation system" in which a carrier emitted from a non-contact type IC card reader 30 is received by a load resistance connected with a tuning circuit of an inductor and a capacitor and a value of the load resistance is varied corresponding to "1"/"0" of sent data.

The non-contact type IC card reader 30 detects a voltage variation of the antenna coil generated depending on a variation of a value of the load resistance of the non-contact type IC card and data from the non-contact type IC card to the non-contact type IC card reader are reproduced.

As described above, the non-contact type IC card reader 30 is required to supply electric power to the non-contact type IC card 20 when communication with a non-contact type IC card 20 is to be performed. An electromagnetic wave is generated as means for supplying electric power. However, this system is classified as a radio system and thus radioactive emission of an electromagnetic wave level (transmission power level) is required to keep within a specified value prescribed by Radio Law in each country. Therefore, the non-contact type card reader 30 in this embodiment is structured so that the communication device 300 is secured with a sufficient electromagnetic wave level (transmission power level) and a radiation level is capable of being lowered or diffused. In other words, the non-contact type card reader 30 in this embodiment is structured so that an unnecessary radiation wave can be decreased while the communication device 300 secures a necessary transmission electric power value. Next, a structure of the communication device 300 of the non-contact type IC card reader 30 in this embodiment will be described below.

[Structure of Communication Device 300 of Non-Contact Type IC Card Reader 30]

Figure 2:
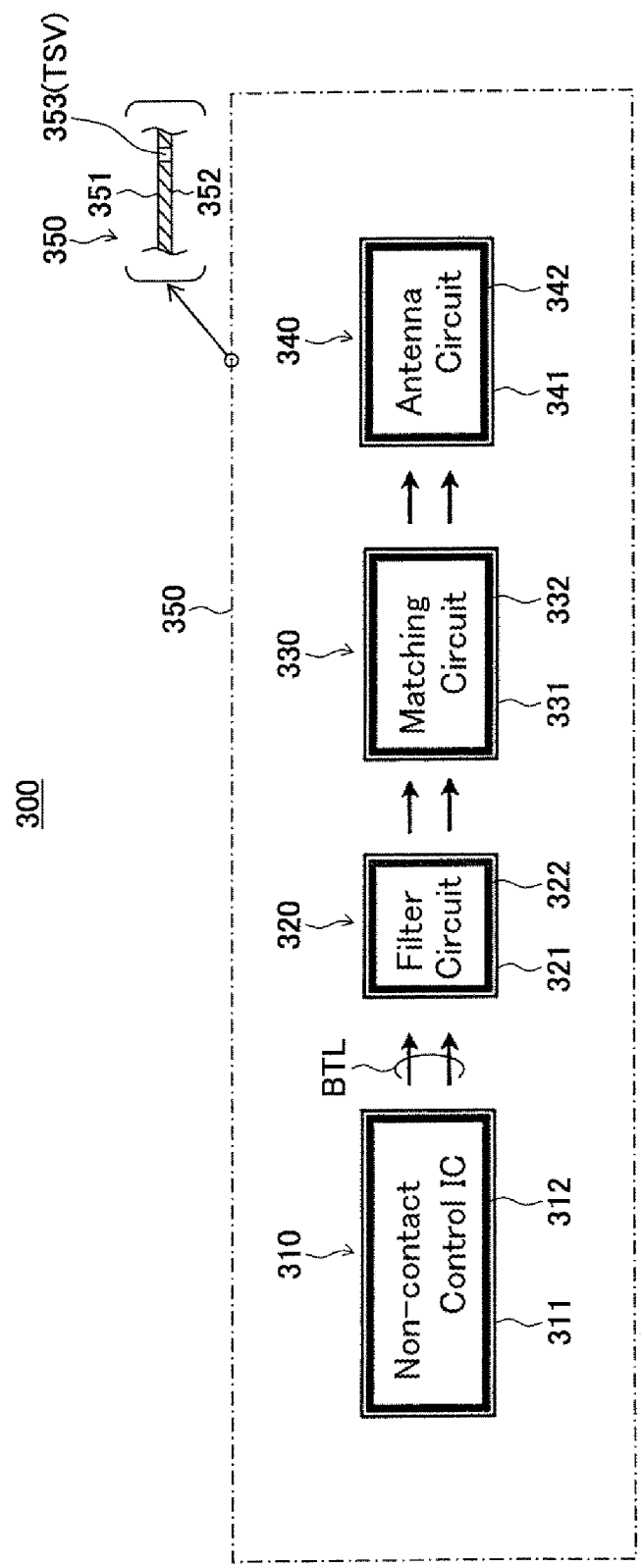
FIG. 2 is a view showing a structural example of a communication device of a non-contact type card reader in accordance with an embodiment of the present invention.

FIG. 2 is a view showing a structural example of the communication device 300 of the non-contact type card reader 30 in accordance with an embodiment of the present invention.

The communication device 300 in FIG. 2 is structured of a non-contact control IC 310 as a non-contact control section, a filter circuit 320, a matching circuit 330, an antenna circuit 340 and a substrate 350 as main structural elements.

In this embodiment, a non-contact control IC 310, a filter circuit 320, a matching circuit 330 and an antenna circuit 340 are arranged and mounted in this order on a substrate 350. In this embodiment, the substrate 350 is formed so that structural elements can be disposed on a first face (for example, front face) 351 and a second face (rear face) 352 which faces the first face 351. Electric connection between the first face 351 and the second face 352 is realized, for example, by a penetration via (Through Silicon Via: TSV) 353.

The non-contact control IC 310 outputs transmission power to the filter circuit 320 in the next stage. The non-contact control IC 310 balanced-outputs transmission power to balanced transmission lines BTL.

The filter circuit 320 inputs a predetermined frequency component of the transmission power outputted from the non-contact control IC 310 to the matching circuit 330. The filter circuit 320 is structured of a low-pass filter (LPF) or a band-pass filter (BPF). In the example shown in FIG. 2, the filter circuit 320 is structured of a low-pass filter (LPF).

The matching circuit 330 receives the transmission power inputted through the filter circuit 320 and performs impedance matching.

The antenna circuit 340 transmits the transmission power as an electromagnetic wave. The antenna circuit 340 is structured so as to include a loop antenna which is, for example, formed of a pattern of the substrate.

The communication device 300 in this embodiment is provided with two systems of the non-contact control IC 310, the filter circuit 320, the matching circuit 330 and the antenna circuit 340. The communication device 300 is provided with two systems of a non-contact control IC 311 of a first system and a non-contact control IC 312 of a second system as the non-contact control IC 310. The communication device 300 is provided with two systems of a filter circuit 321 of the first system and a filter circuit 322 of the second system as the filter circuit 320. The communication device 300 is provided with two systems of a matching circuit 331 of the first system and a matching circuit 332 of the second system as the matching circuit 330. The communication device 300 is provided with two systems of an antenna circuit 341 of the first system and an antenna circuit 342 of the second system as the antenna circuit 340.

In the communication device 300 in this embodiment, two systems of the non-contact control IC 310 are provided, and circuit structures of two systems from outputs of respective systems of the non-contact control ICs 311 and 312 of the first and the second systems to the antenna circuit 340 via the filter circuit 320 and the matching circuit 330 are symmetrically formed.

In the communication device 300, the circuit structures from balanced outputs of the non-contact control IC 310 to substrate pattern terminating ends are arranged so as to be symmetrically crossed over the first face 351 and the second face 352 of the substrate 350. More specifically, the communication device 300 is structured so that substrate patterns of balanced transmission lines BTL for transmitting electric power and circuit elements of two systems of the filter circuit 320, the matching circuit 330 and the antenna circuit 340 are arranged so as to be symmetrically crossed over the first face 351 and the second face 352 of the substrate 350. In this manner, in the communication device 300, the substrate patterns of the balanced transmission lines BTL for transmitting electric power and the components (circuit elements) are arranged so as to be symmetrically crossed on the first face and the second face (front face and rear face) of the substrate and the balanced transmission is performed. As a result, a radiation level of a harmonic component of a transmission power carrier can be lowered.

The substrate patterns of the balanced transmission lines "BTL" for transmitting electric power and the respective circuit elements of two systems of the filter circuit 320, the matching circuit 330 and the antenna circuit 340 are required to be symmetrically arranged but the non-contact control IC 310 is not necessarily required to provide two systems.

The substrate patterns mean wiring patterns formed in the first face 351 and the second face 352 of the substrate 350. However, in this embodiment, as described below with reference to FIGS. 4 through 6 and the like, the substrate patterns mainly mean substrate patterns PTN-BTN of the balanced transmission lines BTL for transmitting electric power and substrate patterns SPTN-(C, F, A, B) forming the antenna.

Figure 3:
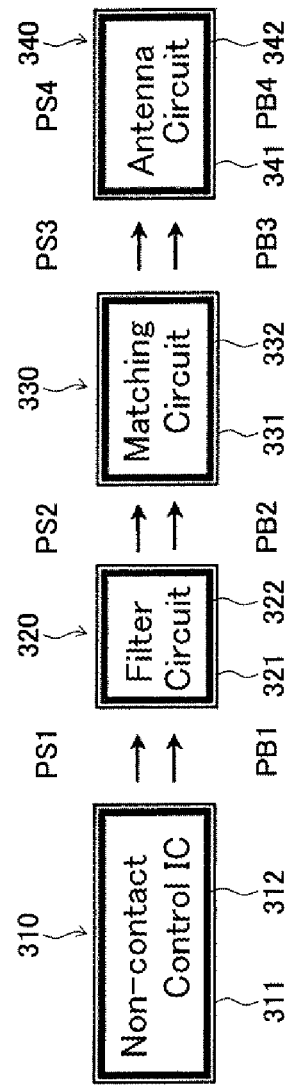
FIG. 3 is an explanatory view showing a basic flow of signals in a case that substrate patterns of balanced transmission lines for transmitting electric power and respective circuit elements of two systems of a filter circuit, a matching circuit and an antenna circuit are symmetrically arranged.

In this embodiment, FIG. 3 is an explanatory view showing a basic flow of signals in a case that the substrate patterns of balanced transmission lines for transmitting electric power and respective circuit elements of two systems of the filter circuit 320, the matching circuit 330 and the antenna circuit 340 are symmetrically arranged. In FIG. 3, PS1 through PS4 indicate flow positions of a signal on the first face (front face) 351 side of the substrate 350 and PB1 through PB4 indicate flow positions of a signal on the second face (rear face) 352 side of the substrate 350.

As described above, in the communication device 300, the circuits from the balanced transmission lines BTL for transmission power from the non-contact control IC 310 to the substrate pattern terminating ends of the positions PS4 and PB4 are arranged so as to be symmetrically crossed. The two systems of the filter circuit 320, the matching circuit 330 and the antenna circuit 340 are arranged so as to be symmetrically crossed in the first face (front face) 351 and the second face (rear face) 352 of the substrate 350. The substrate patterns in the antenna circuit 340 at the positions PS4 and PB4 are formed as pattern wiring lines which are crossed.

A flow of a signal in this example is as follows. A signal flows a route of PS1→PB2→PS3→PB4 from the first face (front face) 351 of the substrate 350. On the other hand, a signal flows a route of PB1→PS2→PB3→PS4 from the second face (rear face) 352 of the substrate 350.

According to this structure, negative and positive harmonic components of an electromagnetic field to the antenna terminating ends can be canceled and reduced. As a result, while securing a sufficient electromagnetic wave level (transmission power level), a radiation level of a harmonic component of a transmission power carrier can lowered or diffused.

Figure 4:
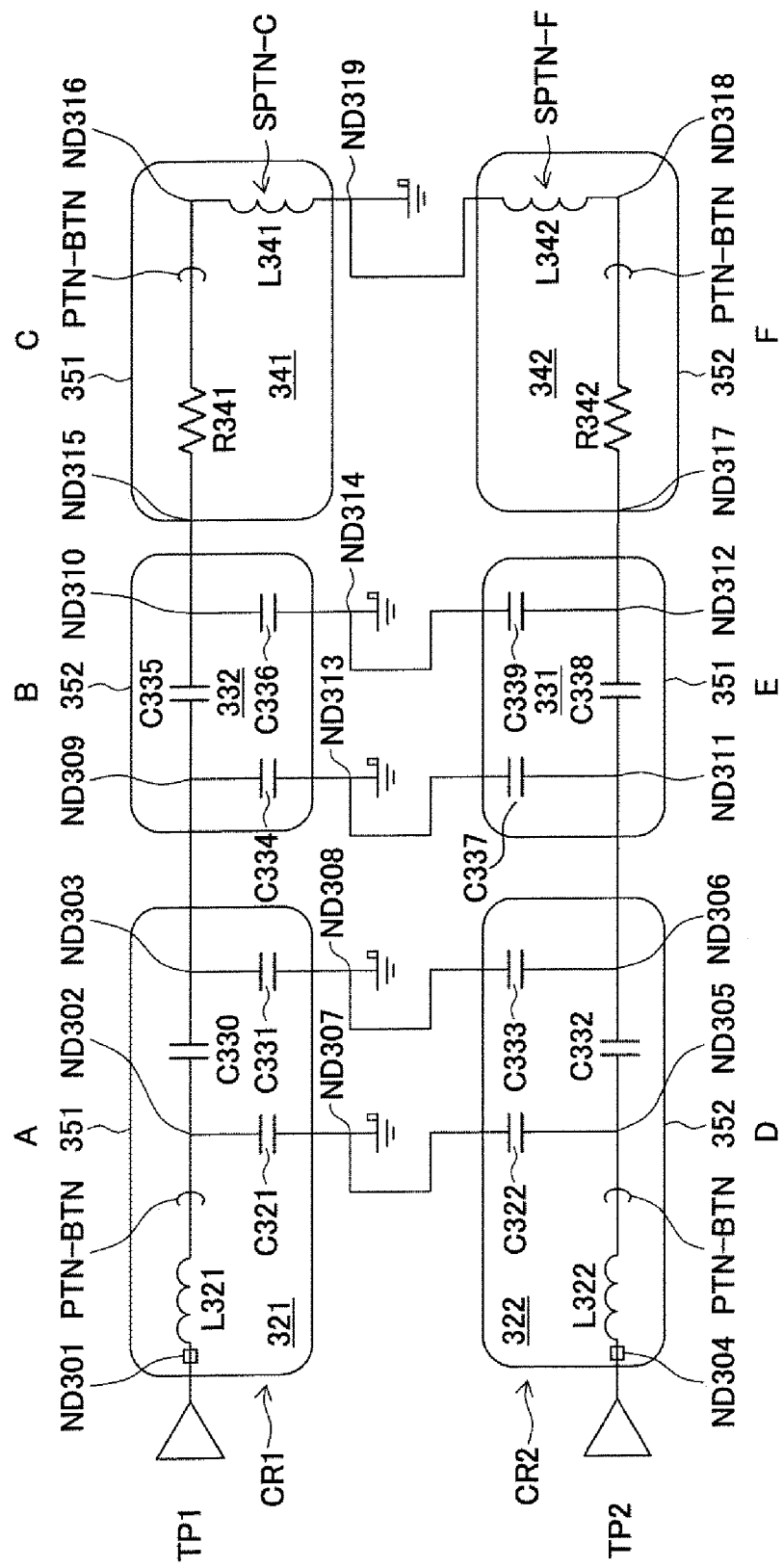
FIG. 4 is a view showing a specific equivalent circuit in which, in this embodiment, substrate patterns of balanced transmission lines for transmitting electric power and respective circuit elements of two systems of a filter circuit, a matching circuit and an antenna circuit are arranged so as to be symmetrically crossed on a first face and a second face of a substrate.

FIG. 4 is a view showing a specific equivalent circuit in which, in this embodiment, substrate patterns of balanced transmission lines for transmitting electric power and respective circuit elements of two systems of the filter circuit 320, the matching circuit 330 and the antenna circuit 340 are arranged so as to be symmetrically crossed in the first face 351 and the second face 352 of the substrate 350.

In the example shown in FIG. 4, the circuit arrangement is sectioned and indicated in regions "A", "B", "C", "D", "E" and "F". The regions "A", "E" and "C" indicate arrangement regions on the first face (front face) 351 side of the substrate 350 and the regions "D", "B" and "F" indicate arrangement regions on the second (rear face) 352 side of the substrate 350.

In the example shown in FIG. 4, transmission lines and circuit elements are symmetrically arranged and crossed in the region "A" of the first face 351 and the region "D" of the second face 352. The region "A" of the first face 351 is arranged with an inductor (coil) L321 and a capacitor C321 structuring the "LPF", which is the filter circuit 321 of the first system, and capacitors C330 and C331 structuring a part of the matching circuit 330. The region "D" of the second face 352 is arranged with an inductor (coil) L322 and a capacitor C322 structuring the "LPF", which is the filter circuit 322 of the second system, and capacitors C332 and C333 structuring a part of the matching circuit 330.

In the region "A" of the first face 351, one balanced output TP1 of transmission power is supplied to a node ND301. One end of the inductor L321 structuring the LPF is connected with the node ND301 and the other end is connected with a node ND302. The capacitor C321 structuring the LPF is connected between the node ND302 and a node ND307 connected with a reference potential (for example, ground potential). The capacitor C330 is connected between the node ND302 and a node ND303. The capacitor C331 is connected between the node ND303 and a node ND308 connected with a reference potential (for example, ground potential).

In the filter circuit 321, a noise component of a high frequency is reflected on an input port side of the inductor L321 and further a noise component of a high frequency is flowed to the ground through the capacitor C321 and the noise component is eliminated. The signal in which passage of a high frequency band is suppressed is transmitted through the capacitor C330 from the node ND302 to the matching circuit 332 in the next stage.

In the region "D" of the second face 352, the other balanced output TP2 of transmission power is supplied to a node ND304. One end of an inductor L322 structuring a LPF is connected with the node ND304 and the other end is connected with a node ND305. The capacitor C322 structuring the LPF is connected with the node ND305 and the node ND307 connected with the reference potential (for example, ground potential) which is common to the region "A". Connection to the common node ND307 is performed by a penetration via (TSV) or the like. A capacitor C332 is connected between the node ND305 and a node ND306. A capacitor C333 is connected with the node ND306 and the node ND308 connected with the reference potential (for example, ground potential) which is common to the region "A". Connection to the common node ND308 is performed by a penetration via (TSV) or the like.

In the filter circuit 322, a noise component of a high frequency is reflected on an input port side of the inductor L322 and further a noise component of a high frequency is flowed to the ground through the capacitor C322 and the noise component is eliminated. The signal in which passage of a high frequency band is suppressed is transmitted through the capacitor C332 from the node ND305 to the matching circuit 331 in the next stage.

The node ND303 of the region "A" of the first face 351 is connected with a node ND309 of the region "B" of the second face 352 by a penetration via (TSV) or the like. Similarly, the node ND306 of the region "D" of the second face 352 is connected with a node ND311 of the region "E" of the first face 351 by a penetration via (TSV) or the like.

In the region "B" of the second face 352, a capacitor C334 is connected between the node ND309 and a node ND313 connected with a reference potential (for example, round potential). A capacitor C335 is connected between the node ND309 and a node ND310. A capacitor C336 is connected between the node ND310 and a node ND314 connected with a reference potential (for example, ground potential).

In the region "E" of the first face 351, a capacitor C 337 is connected between the node ND311 and the node ND313 connected with the reference potential (for example, ground potential) which is common to the region "B". Connection to the common node ND313 is performed by a penetration via (TSV) or the like. A capacitor C338 is connected between the node ND311 and a node ND312. A capacitor C339 is connected between the node ND312 and the node ND314 connected with the reference potential (for example, ground potential) which is common to the region "B". Connection to the common node ND314 is performed by a penetration via (TSV) or the like.

The node ND 310 of the region "B" of the second face 352 is connected with a node ND315 of the region "C" of the first face 351 by a penetration via (TSV) or the like. Similarly, the node ND312 of the region "E" of the first face 351 is connected with a node ND317 of the region "F" of the second face 352 by a penetration via (TSV) or the like.

In the region "C" of the first face 351, one end of a resistance element R341 is connected with the node ND315 and the other end is connected with a node ND316. One end of an inductor L341 forming an antenna coil is connected with the node ND316 and the other end is connected with a node ND319 which is connected with a reference potential (for example, ground potential).

In the region "F" of the second face 352, one end of a resistance element R342 is connected with the node ND317 and the other end is connected to a node ND318. One end of an inductor L342 forming an antenna coil is connected with the node ND318 and the other end is connected with the node ND319 connected with the reference potential (for example, ground potential) common to the region "C". Connection to the common node ND319 is performed by a penetration via (TSV) or the like.

As described above, in the example shown in FIG. 4, the substrate patterns PTN-BTL of the balanced transmission lines BTL for transmitting electric power and two systems of the respective circuit elements of the filter circuit 320, the matching circuit 330 and the antenna circuit 340 (inductor "L", capacitor "C" and resistance element "R") are arranged so as to be crossed in a substantially completely symmetrical manner over the first face 351 and the second face 352 of the substrate 350. More specifically, in the communication device 300, the circuits from the balanced outputs of the non-contact control IC 310 to the termination ends of the loop antennas formed by a pattern of the substrate are wired in the same length, the same width and the same thickness as each other and symmetrically arranged including the substrate.

[Arrangement of Substrate]

Figure 5:
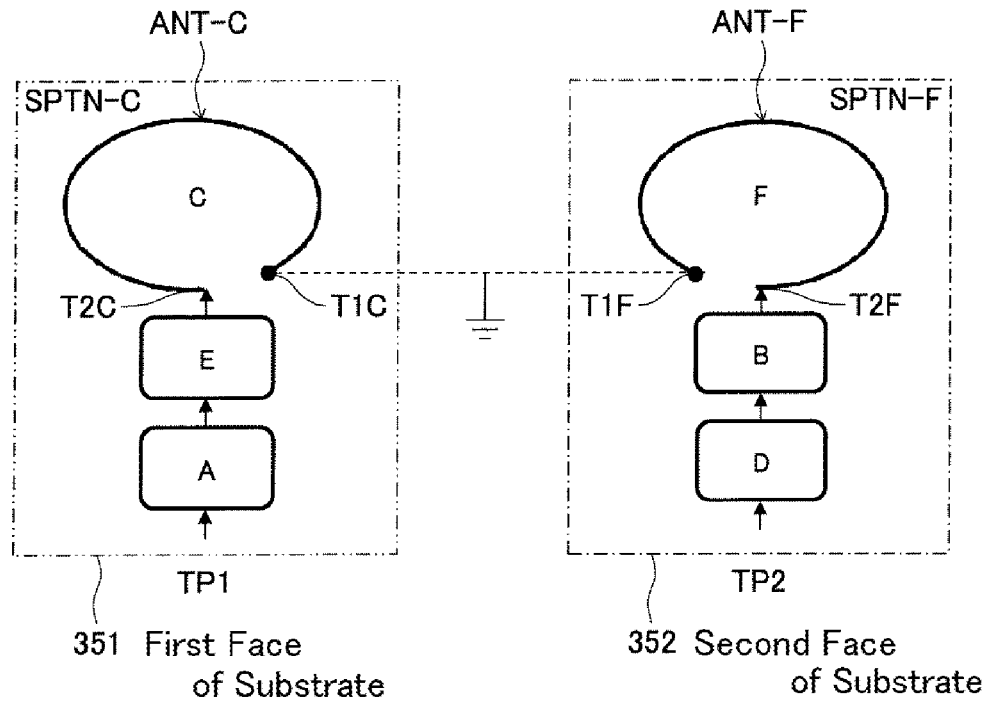
FIG. 5 is a view showing circuit blocks of regions "A" through "F" which are extracted from an arrangement example of substrate patterns and respective circuit elements in FIG. 4.
Figure 6A:
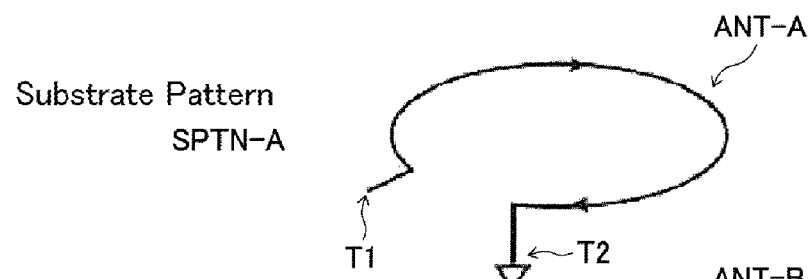
FIGS. 6A and 6B are views showing an example of a loop antenna symmetrically formed of a substrate pattern.
Figure 6B:
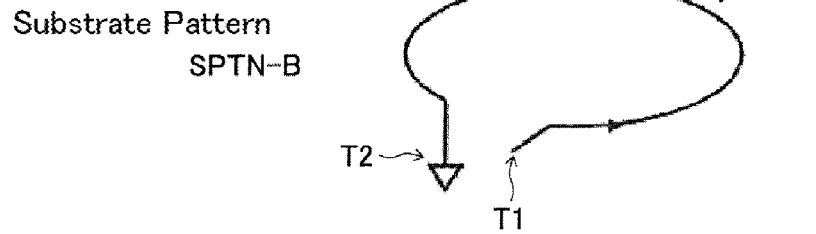

FIG. 5 is a view showing the circuit blocks of the regions "A" through "F" which are extracted from an arrangement example of the substrate patterns and the respective circuit elements in FIG. 4. FIGS. 6A and 6B are views showing an example of loop antennas symmetrically formed of substrate patterns.

When the circuit blocks are to be arranged in the first face 351 and the second face 352 of the substrate 350, a pattern of an inner layer part is arranged so as not to affect the respective circuit blocks and so that another signal is not mixed. Further, since being affected by capacitance between inner layers, arrangement is performed in the same condition, for example, including existence/absence of copper foil.

In an example shown in FIG. 5, the arrangement regions "A", "E" and "C" for a circuit are arranged on the first face 351 of the substrate 350 and one balanced output (first transmission power) TP1 of transmission power is transmitted. The arrangement regions "D", "B" and "F" for a circuit are arranged on the second face 352 of the substrate 350 and the other balanced output (second transmission power) TP2 of transmission power is transmitted. One end parts T1C and T1F of the loop antennas ANT-C and ANT-F symmetrically formed in the regions "C" and "F" are connected with a ground potential. The other end parts T2C and T2F of the loop antennas ANT-C and ANT-F are connected with output ends of the matching circuits 331 and 332 of the former stages.

In other words, the circuit shown in FIG. 4 is basically structured as described below. The filter circuit 321, the matching circuit 331 and the antenna circuit 341 in a first system of two systems are arranged on the first face 351 of the substrate 350, and the filter circuit 322, the matching circuit 332 and the antenna circuit 342 in a second system of the two systems are arranged on the second face 352. The circuits of two systems from the balanced outputs of the non-contact control IC 310 are arranged so as to form two lines of circuit arrangements CR1 and CR2.

In the circuit arrangement CR1 of the first line, the filter circuit 321 of the first system of the filter circuit 320, the matching circuit 332 of the second system of the matching circuit 330, and the antenna circuit 341 of the first system of the antenna circuit 340 are arranged in this order from the first balanced output TP1 of the non-contact control IC310. Further, the output side node ND303 of the filter circuit 321 in the first system of the filter circuit 320 is connected with the input side node ND309 of the matching circuit 332 in the second system of the matching circuit 330, and the output side node ND310 of the matching circuit 332 in the second system of the matching circuit 330 is connected with the input side node ND315 of the antenna circuit 341 in the first system of the antenna circuit 340.

In the circuit arrangement CR2 of the second line, the filter circuit 322 of the second system of the filter circuit 320, the matching circuit 331 of the first system of the matching circuit 330, and the antenna circuit 342 of the second system of the antenna circuit 340 are arranged in this order from the second balanced output TP2 of the non-contact control IC310. Further, the output side node ND306 of the filter circuit 322 in the second system of the filter circuit 320 is connected with the input side node ND311 of the matching circuit 331 in the first system of the matching circuit 330, and the output side node ND312 of the matching circuit 331 in the first system of the matching circuit 330 is connected with the input side node ND317 of the antenna circuit 342 in the second system of the antenna circuit 340.

In addition, in the filter circuit 320 of two systems, the node ND302 of the filter circuit 321 of the first system in the circuit arrangement CR1 of the first line and the node ND305 of the filter circuit 322 of the second system in the circuit arrangement CR2 of the second line are connected with each other through the node ND307, and the nodes ND303 and ND306 are connected with each other through the node ND308. In the matching circuit 330 of two systems, the node ND309 of the matching circuit 332 of the second system in the circuit arrangement CR1 of the first line and the node ND311 of the matching circuit 331 of the first system in the circuit arrangement CR2 of the second line are connected with each other through the node ND313, and the nodes ND310 and ND312 are connected with each other through the node ND314. In the antenna circuit 340 of two systems, the node ND316 of the antenna circuit 341 of the first system in the circuit arrangement CR1 of the first line and the node ND318 of the antenna circuit 342 of the second system in the circuit arrangement CR2 of the second line are connected with each other through the node ND319.

The first transmission power outputted from the first balanced output TP1 of the non-contact control IC 310 is transmitted though the filter circuit 321, the matching circuit 331 and the antenna circuit 341 of the first system in the circuit arrangements CR1 and CR2 of the first line and the second line. The second transmission power outputted from the second balanced output TP2 of the non-contact control IC 310 is transmitted through the filter circuit 322, the matching circuit 332 and the antenna circuit 342 of the second system in the circuit arrangements CR2 and CR1 of the second line and the first line.

As described above, in this embodiment, the substrate patterns PTN-BTN of the balanced transmission lines BTN for transmitting electric power and the components (circuit elements) are arranged in the first face 351 and the second face 352 of the substrate 350 so as to be symmetrically crossed in a substantially complete manner and balanced transmission is performed and thus a radiation level of a harmonic component of the transmission power carrier can be surely and efficiently lowered. Further, in this embodiment, a signal is transmitted for each of the two systems and the signal of the other system can be suppressed from being mixed and, as a result, a radiation level of a harmonic component of the transmission power carrier can be surely and efficiently lowered.

In the example described above, the filter circuit 320, the matching circuit 330 and the antenna circuit 340 are arranged for the balanced outputs of the non-contact control IC 310. However, the present invention is not limited to the structure shown in FIGS. 4 and 5. In this case, it is basically structured as described below.

A first face 351 of the substrate 350 is arranged with circuits of the first system of two systems and a second face 352 is arranged with circuits of the second system of the two systems. The circuits of the two systems are arranged so as to structure two lines of circuit arrangements CR1 and CR2 from balanced outputs of the non-contact control IC 310. In the circuit arrangement CR1 of the first line, the circuit of the first system and the circuit of the second system are sequentially arranged from a first balanced output TP1 of the non-contact control IC 310, and an output side node of the circuit in the former stage and an input side node of the circuit in the latter stage are connected with each other. In the circuit arrangement CR2 of the second line, the circuit of the second system and the circuit of the first system are sequentially arranged from a second balanced output TP2 of the non-contact control IC 310, and an output side node of the circuit in the former stage and an input side node of the circuit in the latter stage are connected with each other. In addition, in the similar circuits of the two systems, predetermined nodes of the first system circuit and the second system circuit of the circuit arrangements CR1 and CR2 of the first line and the second line are connected with each other.

Next, a structure of the loop antenna will be described below. Loop antennas ANT-C and ANT-F formed of substrate patterns SPTN-C and SPTN-F are sufficient to be formed symmetrically and thus patterns of an outer layer, an inner layer, a twist or the like may be applied.

In the example shown in FIGS. 6A and 6B, an antenna pattern SPTN-A in FIG. 6A is formed from one end part T1 toward the other end part T2 so as to form a loop in a clockwise direction. An antenna pattern SPTN-B in FIG. 6B is formed from one end part T1 toward the other end part T2 so as to form a loop in a counterclockwise direction.

In FIG. 5, as an example, the antenna pattern SPTN-B shown in FIG. 6B is applied in the region "C" on the first face 351 side of the substrate 350, and the antenna pattern SPTN-A in FIG. 6A is applied in the region "F" on the second face 352 side of the substrate 350.

As shown in FIGS. 6A and 6B, the substrate patterns SPTN-A and SPTN-B can be wired on an outer layer, on an inner layer when a multilayer substrate is used and, as described above, twisting of a substrate pattern may be effective.

Generally, even when such fine arrangement and pattern design are not performed, product functions can be satisfied when transmission power can be transmitted normally. However, radioactive emission of an EMC (Electro-Magnetic Compatibility) test which relates to product performance causes deterioration of a radiation level due to influence of a phase shift of balanced transmission and reflection accompanied therewith. Therefore, in accordance with the embodiment described above, the arrangement structure in which the circuit elements and the transmission lines are arranged symmetrically is remarkably effective for preventing emission of an unnecessary radiation wave or for reducing it.

The EMC test is a tolerance test for measuring whether a function and operation of an electric apparatus is disturbed or not by a disturbance electromagnetic wave from an inside of the apparatus and from its outside.

As described above, according to this embodiment, the non-contact type IC card reader 30 is provided with the non-contact control IC 310 configured to balanced-output transmission power, the antenna circuit 340 configured to transmit transmission power as an electromagnetic wave, the matching circuit 330 which is disposed between an output of the non-contact control IC 310 and an input of the antenna circuit 340 and is configured to perform impedance matching, and the filter circuit 320 which is disposed between an output of the non-contact control IC 310 and an input of the matching circuit 330 and is configured to input a predetermined frequency component of the transmission power outputted from the non-contact control IC 310 into the matching circuit 330. The non-contact type IC card reader 30 is provided with two systems of the filter circuit 320, the matching circuit 330 and the antenna circuit 340. Further, the circuit structures from an output of the non-contact control IC 310 to two systems of the antenna circuit 340 via the filter circuit 320 and the matching circuit 330 are formed symmetrically.

Principal Effects in this Embodiment

According to this embodiment, the following effects can be obtained. In this embodiment, the circuit structures from balanced outputs of the non-contact control IC 310 to two systems of the antenna circuit 340 via the filter circuit 320 and the matching circuit 330 are formed symmetrically. Therefore, a margin for a specified value determined by Radio Law (radioactive emission) is prevented from becoming insufficient or, alternatively, a situation exceeding the specified value is prevented. Accordingly, while securing a sufficient electromagnetic wave level (transmission power level), a radiation level of a harmonic component of a transmission power carrier can be lowered or diffused.

In this embodiment, the balanced transmission lines BTL for transmitting electric power and the respective circuit elements of two systems of the filter circuit 320, the matching circuit 330 and the antenna circuit 340 are symmetrically arranged over the first face 351 and the second face 352 of the substrate 350. As described above, in this embodiment, the non-contact control IC 310, the balanced transmission lines for transmitting electric power, and the respective circuit elements of two systems are symmetrically arranged over the first face 351 and the second face 352 of the substrate 350. Therefore, negative and positive harmonic components generated in a route to the antenna terminating ends can be canceled and reduced. As a result, while securing a sufficient electromagnetic wave level (transmission power level), a radiation level of a harmonic component of a transmission power carrier can lowered or diffused.

In this embodiment, circuits from the balanced outputs of the non-contact control IC 310 to the substrate pattern terminating ends are arranged so as to be crossed symmetrically over the first face 351 and the second face 352. As described above, in this embodiment, the circuits from the balanced outputs to the substrate pattern terminating ends are arranged so as to be symmetrically crossed over the first face 351 and the second face 352 and thus negative and positive harmonic components generated in a route to the antenna terminating ends can be surely canceled and reduced.

In this embodiment, the substrate patterns PTN-BTL of the balanced transmission lines BTL for transmitting electric power and the respective circuit elements of two systems of the filter circuit 320, the matching circuit 330 and the antenna circuit 340 are arranged so as to be symmetrically crossed over the first face 351 and the second face 352 of the substrate 350. As described above, in this embodiment, the substrate patterns PTN-BTL of the balanced transmission lines for transmitting electric power and the components (circuit elements) are arranged so as to be symmetrically crossed on the first face 351 and the second face 352 (front and rear faces) of the substrate 350 and balanced transmission is performed. Therefore, a radiation level of a harmonic component of a transmission power carrier can be lowered. It is a requisite that a radiation level is kept within a specified value in a band width prescribed in the ITU-R (International Telecommunication Union radiocommunication sector) and thus a reduction effect of a radiation level is important.

In this embodiment, the antenna of the antenna circuit 340 includes a loop antenna formed by a pattern of the substrate, and the circuits from the balanced outputs of the non-contact control IC 310 to the loop antenna terminating ends formed by a pattern of the substrate are wired in the same length, the same width and the same thickness as each other and the circuits including the substrate are symmetrically arranged. As described above, according to this embodiment, the circuits from the balanced outputs of the non-contact control IC 310 to the loop antenna terminating ends formed by a pattern of the substrate are wired in the same length, the same width and the same thickness as each other and the circuits including the substrate are symmetrically arranged. Therefore, negative and positive harmonic components generated in a route to the antenna terminating ends can be surely canceled and reduced and thus a radiation level of a harmonic component of a transmission power carrier can be lowered.

Other Embodiments

In at least an embodiment of the present invention, instead of using a multilayer substrate structure (two layers in the embodiment described above), a loop antenna of a substrate pattern may be structured in a single layer substrate so as to be arranged in a bilateral symmetry and, also in this case, similar effects can be obtained.

Figure 7:
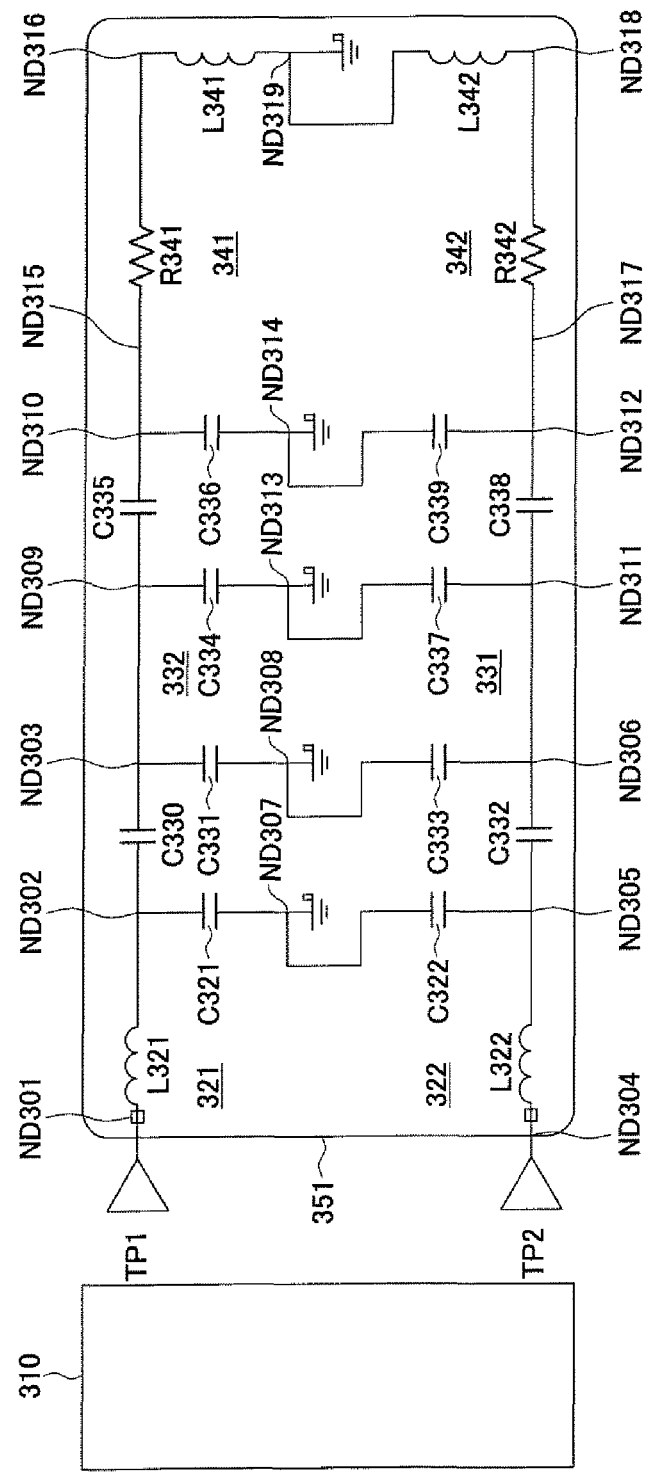
FIG. 7 is a view showing a specific equivalent circuit in which substrate patterns of balanced transmission lines for transmitting electric power and respective circuit elements of two systems of a filter circuit, a matching circuit and an antenna circuit are symmetrically arranged on only one face side of a substrate.

FIG. 7 is a view showing a specific equivalent circuit in which substrate patterns of balanced transmission lines for transmitting electric power and respective circuit elements of two systems of a filter circuit, a matching circuit and an antenna circuit are symmetrically arranged on only one face side of a substrate in accordance with an embodiment of the present invention. For easy understanding, in FIG. 7, structural portions similar to FIG. 4 are shown by using the same reference signs.

In the embodiment shown in FIG. 7, a non-contact control IC 310, balanced transmission lines for transmitting electric power and respective circuit elements (inductor "L", capacitor "C" and resistance element "R") of two systems of a filter circuit 320, a matching circuit 330 and an antenna circuit 340 are arranged on one face side, for example, in a first face 351 of a substrate 350. In the embodiment shown in FIG. 7, no circuit is arranged on the other face side (rear face) of the substrate 350.

As described above, in at least an embodiment of the present invention, the non-contact control IC 310, the balanced transmission lines for transmitting electric power and respective circuit elements (inductor "L", capacitor "C" and resistance element "R") of two systems of the filter circuit 320, the matching circuit 330 and the antenna circuit 340 are arranged on one face side (first face 351 side) of the substrate 350. Therefore, structure and manufacture of the circuit is easy and, in addition, while securing a sufficient electromagnetic wave level (transmission power level), a radiation level of a harmonic component of a transmission power carrier can lowered or diffused.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A communication device for supplying electric power to a communication partner, the communication device comprising:
   a non-contact control section configured to balanced-output transmission power;
   an antenna circuit configured to transmit the transmission power as an electromagnetic wave; and a matching circuit disposed between an output of the non-contact control section and an input of the antenna circuit and configured to perform impedance matching;

wherein the matching circuit and the antenna circuit are respectively provided with two systems;

wherein the antenna circuit comprises:
 a first antenna circuit of a first system; and
 a second antenna circuit of a second system;

wherein the matching circuit comprises:
 a first matching circuit of the first system; and
 a second matching circuit of the second system; and wherein circuit structures from the output of the non-contact control section to the first antenna circuit via the first matching circuit and the second antenna circuit via the second matching circuit are formed symmetrically.

2. The communication device according to claim 1, further comprising a filter circuit which is disposed between the output of the non-contact control section and an input of the matching circuit and configured to input a predetermined frequency component of the transmission power outputted from the non-contact control section into the matching circuit,
 wherein the filter circuit is provided with two systems, and
 wherein structures of the filter circuits of the two systems are formed symmetrically.

3. The communication device according to claim 2, further comprising a substrate,
 wherein the non-contact control section, balanced transmission lines for transmitting electric power, and respective circuit elements of the two systems are arranged on one face side of the substrate.

4. The communication device according to claim 2, further comprising a substrate whose first face and second face facing the first face are capable of disposing structural elements,
 wherein balanced transmission lines for transmitting electric power and respective circuit elements of the two systems are symmetrically arranged over the first face and the second face of the substrate.

5. The communication device according to claim 4, wherein circuits from balanced outputs of the non-contact control section to substrate pattern terminating ends are arranged so as to be symmetrically crossed over the first face and the second face.

6. The communication device according to claim 4, wherein substrate patterns of balanced transmission lines for transmitting electric power and respective circuit elements of the two systems are arranged so as to be symmetrically crossed over the first face and the second face of the substrate.

7. The communication device according to claim 4, wherein
 the first face of the substrate is arranged with a circuit of a first system of the two systems,
 the second face is arranged with a circuit of a second system of the two systems,
 the circuits of the two systems are arranged so as to form two lines of circuit arrangements from balanced outputs of the non-contact control section,
 the circuit arrangement of a first line is disposed with the circuit of the first system and the circuit of the second system sequentially from a first balanced output of the non-contact control section, and an output side node of the circuit in a former stage and an input side node of the circuit in a latter stage are connected with each other,
 the circuit arrangement of a second line is disposed with the circuit of the second system and the circuit of the first system sequentially from a second balanced output of the non-contact control section, and an output side node of the circuit in a former stage and an input side node of the circuit in a latter stage are connected with each other, and
 predetermined nodes of the circuit of the first system and the circuit of the second system of similar circuits of the two systems are connected with each other in the circuit arrangements of the first line and the second line.

8. The communication device according to claim 7, wherein
 first transmission power which is outputted from the first balanced output of the non-contact control section is transmitted through the circuits of the first system of the circuit arrangements of the first line and the second line, and
 second transmission power which is outputted from the second balanced output of the non-contact control section is transmitted through the circuits of the second system of the circuit arrangements of the first line and the second line.

9. The communication device according to claim 8, wherein
 first transmission power which is outputted from the first balanced output of the non-contact control section is transmitted through the circuits of the first system of the circuit arrangements of the first line and the second line, and
 second transmission power which is outputted from the second balanced output of the non-contact control section is transmitted through the circuits of the second system of the circuit arrangements of the first line and the second line.

10. The communication device according to claim 4, wherein
 two systems of the filter circuit, the matching circuit and the antenna circuit are provided for balanced outputs of the non-contact control section,
 the first face of the substrate is arranged with the filter circuit, the matching circuit and the antenna circuit of a first system of the two systems,
 the second face of the substrate is arranged with the filter circuit, the matching circuit and the antenna circuit of a second system of the two systems,
 the circuits of the two systems are arranged so as to form two lines of circuit arrangements from balanced outputs of the non-contact control section,
 the circuit arrangement of a first line is sequentially disposed with the filter circuit of the first system, the matching circuit of the second system, and the antenna circuit of the first system from a first balanced output of the non-contact control section,
 an output side node of the filter circuit of the first system and an input side node of the matching circuit of the second system are connected with each other, and an output side node of the matching circuit of the second system and an input side node of the antenna circuit of the first system are connected with each other,
 the circuit arrangement of a second line is sequentially disposed with the filter circuit of the second system, the matching circuit of the first system, and the antenna circuit of the second system from a second balanced output of the non-contact control section,
an output side node of the filter circuit of the second system and an input side node of the matching circuit of the first system are connected with each other, and an output side node of the matching circuit of the first system and an input side node of the antenna circuit of the second system are connected with each other,
predetermined nodes of the filter circuit of the first system in the circuit arrangement of the first line and the filter circuit of the second system in the circuit arrangement of the second line of the filter circuits of the two systems are connected with each other,
predetermined nodes of the matching circuit of the second system in the circuit arrangement of the first line and the matching circuit of the first system in the circuit arrangement of the second line of the matching circuits of the two systems are connected with each other, and
predetermined nodes of the antenna circuit of the first system in the circuit arrangement of the first line and the antenna circuit of the second system in the circuit arrangement of the second line of the antenna circuits of the two systems are connected with each other.

11. The communication device according to claim 4, wherein
an antenna of the antenna circuit includes a loop antenna formed by a pattern of the substrate,
circuits from balanced outputs of the non-contact control section to terminating ends of the loop antennas formed by a pattern of the substrate are wired in a same length, a same width and a same thickness as each other, and
the circuits including the substrate are symmetrically arranged.

12. The communication device according to claim 1, further comprising a substrate,
wherein the non-contact control section, balanced transmission lines for transmitting electric power, and respective circuit elements of the two systems are arranged on one face side of the substrate.

13. The communication device according to claim 12, wherein
an antenna of the antenna circuit includes a loop antenna formed by a pattern of the substrate,
circuits from balanced outputs of the non-contact control section to terminating ends of the loop antennas formed by a pattern of the substrate are wired in a same length, a same width and a same thickness as each other, and
the circuits including the substrate are symmetrically arranged.

14. The communication device according to claim 1, further comprising a substrate whose first face and second face facing the first face are capable of disposing structural elements,
wherein balanced transmission lines for transmitting electric power and respective circuit elements of the two systems are symmetrically arranged over the first face and the second face of the substrate.

15. A non-contact type card reader comprising a communication device for supplying electric power to a non-contact type IC card when the non-contact type card reader is to be wirelessly communicated with the non-contact type IC card,
wherein the communication device comprises:
a non-contact control section configured to balanced-output transmission power;
an antenna circuit configured to transmit the transmission power as an electromagnetic wave; and
a matching circuit disposed between an output of the non-contact control section and an input of the antenna circuit and configured to perform impedance matching;
wherein the matching circuit and the antenna circuit are respectively provided with two systems;
wherein the antenna circuit comprises:
a first antenna circuit of a first system; and
a second antenna circuit of a second system;
wherein the matching circuit comprises:
a first matching circuit of the first system; and
a second matching circuit of the second system; and
wherein circuit structures from the output of the non-contact control section to the first antenna circuit via the first matching circuit and the second antenna circuit via the second matching circuit are formed symmetrically.

16. The non-contact type card reader according to claim 15, wherein
the communication device comprises a filter circuit which is disposed between the output of the non-contact control section and an input of the matching circuit and configured to input a predetermined frequency component of the transmission power outputted from the non-contact control section into the matching circuit,
the filter circuit is provided with two systems, and
structures of the filter circuits of the two systems are formed symmetrically.

17. The non-contact type card reader according to claim 16, wherein
the communication device comprises a substrate, and
the non-contact control section, balanced transmission lines for transmitting electric power, and respective circuit elements of the two systems are arranged on one face side of the substrate.

18. The non-contact type card reader according to claim 15, wherein
the communication device comprises a substrate whose first face and second face facing the first face are capable of disposing structural elements, and
balanced transmission lines for transmitting electric power and respective circuit elements of the two systems are symmetrically arranged over the first face and the second face of the substrate.

19. The non-contact type card reader according to claim 18, wherein circuits from balanced outputs of the non-contact control section to substrate pattern terminating ends are arranged so as to be symmetrically crossed over the first face and the second face.

20. The non-contact type card reader according to claim 18, wherein substrate patterns of balanced transmission lines for transmitting electric power and respective circuit elements of the two systems are arranged so as to be symmetrically crossed over the first face and the second face of the substrate.

21. The non-contact type card reader according to claim 18, wherein
the first face of the substrate is arranged with a circuit of a first system of the two systems,
the second face is arranged with a circuit of a second system of the two systems,
the circuits of the two systems are arranged so as to form two lines of circuit arrangements from balanced outputs of the non-contact control section,
the circuit arrangement of a first line is disposed with the circuit of the first system and the circuit of the second system sequentially from a first balanced output of the non-contact control section, and an output side node of the circuit in a former stage and an input side node of the circuit in a latter stage are connected with each other, the circuit arrangement of a second line is disposed with the circuit of the second system and the circuit of the first system sequentially from a second balanced output of the non-contact control section, and an output side node of the circuit in a former stage and an input side node of the circuit in a latter stage are connected with each other, and predetermined nodes of the circuit of the first system and the circuit of the second system of similar circuits of the two systems are connected with each other in the circuit arrangements of the first line and the second line.

22. The non-contact type card reader according to claim 18, wherein two systems of the filter circuit, the matching circuit and the antenna circuit are provided for balanced outputs of the non-contact control section, the first face of the substrate is arranged with the filter circuit, the matching circuit and the antenna circuit of a first system of the two systems, the second face of the substrate is arranged with the filter circuit, the matching circuit and the antenna circuit of a second system of the two systems, the circuits of the two systems are arranged so as to form two lines of circuit arrangements from balanced outputs of the non-contact control section, the circuit arrangement of a first line is sequentially disposed with the filter circuit of the first system, the matching circuit of the second system, and the antenna circuit of the first system from a first balanced output of the non-contact control section, an output side node of the filter circuit of the first system and an input side node of the matching circuit of the second system are connected with each other, and an output side node of the matching circuit of the second system and an input side node of the antenna circuit of the first system are connected with each other, the circuit arrangement of a second line is sequentially disposed with the filter circuit of the second system, the matching circuit of the first system, and the antenna circuit of the second system from a second balanced output of the non-contact control section, an output side node of the filter circuit of the second system and an input side node of the matching circuit of the first system are connected with each other, and an output side node of the matching circuit of the first system and an input side node of the antenna circuit of the second system are connected with each other, predetermined nodes of the filter circuit of the first system in the circuit arrangement of the first line and the filter circuit of the second system in the circuit arrangement of the second line of the filter circuits of the two systems are connected with each other, predetermined nodes of the matching circuit of the second system in the circuit arrangement of the first line and the matching circuit of the first system in the circuit arrangement of the second line of the matching circuits of the two systems are connected with each other, and predetermined nodes of the antenna circuit of the first system in the circuit arrangement of the first line and the antenna circuit of the second system in the circuit arrangement of the second line of the antenna circuits of the two systems are connected with each other.

23. The non-contact type card reader according to claim 18, wherein an antenna of the antenna circuit includes a loop antenna formed by a pattern of the substrate, circuits from balanced outputs of the non-contact control section to terminating ends of the loop antennas formed by a pattern of the substrate are wired in a same length, a same width and a same thickness as each other, and the circuits including the substrate are symmetrically arranged.

24. The non-contact type card reader according to claim 15, wherein the communication device comprises a substrate, and the non-contact control section, balanced transmission lines for transmitting electric power, and respective circuit elements of the two systems are arranged on one face side of the substrate.

25. The non-contact type card reader according to claim 24, wherein an antenna of the antenna circuit includes a loop antenna formed by a pattern of the substrate, circuits from balanced outputs of the non-contact control section to terminating ends of the loop antennas formed by a pattern of the substrate are wired in a same length, a same width and a same thickness as each other, and the circuits including the substrate are symmetrically arranged.

26. A wireless system comprising:

a non-contact type IC card; and a non-contact type card reader comprising a communication device for supplying electric power to the non-contact type IC card when the non-contact type card reader is to be wirelessly communicated with the non-contact type IC card;

wherein the communication device comprises:

a non-contact control section configured to balanced-output transmission power;

an antenna circuit configured to transmit the transmission power as an electromagnetic wave; and a matching circuit disposed between an output of the non-contact control section and an input of the antenna circuit and configured to perform impedance matching;

wherein the matching circuit and the antenna circuit are respectively provided with two systems;

wherein the antenna circuit comprises:

a first antenna circuit of a first system; and a second antenna circuit of a second system;

wherein the matching circuit comprises:

a first matching circuit of the first system; and a second matching circuit of the second system; and wherein circuit structures from the output of the non-contact control section to the first antenna circuit via the first matching circuit and the second antenna circuit via the second matching circuit are formed symmetrically.

27. The wireless system according to claim 26, wherein the communication device comprises a filter circuit which is disposed between the output of the non-contact control section and an input of the matching circuit and configured to input a predetermined frequency component of the transmission power outputted from the non-contact control section into the matching circuit, the filter circuit is provided with two systems, and structures of the filter circuits of the two systems are formed symmetrically.

28. The wireless system according to claim 27, wherein
the communication device comprises a substrate, and
the non-contact control section, balanced transmission lines for transmitting electric power, and respective circuit elements of the two systems are arranged on one face side of the substrate.

29. The wireless system according to claim 27, wherein
the communication device comprises a substrate whose first face and second face facing the first face are capable of disposing structural elements, and
balanced transmission lines for transmitting electric power and respective circuit elements of the two systems are symmetrically arranged over the first face and the second face of the substrate.

30. The wireless system according to claim 29, wherein circuits from balanced outputs of the non-contact control section to substrate pattern terminating ends are arranged so as to be symmetrically crossed over the first face and the second face.

* * * * *